US008556064B2

(12) United States Patent  
Smith et al.

(10) Patent No.: US 8,556,064 B2
(45) Date of Patent: Oct. 15, 2013

(54) DOUBLE EDGED BELT SCRAPER BLADE

(75) Inventors: Christopher Scott Smith, Huntington, WV (US); Glenn Edward Farrow, Barboursville, WV (US)

(73) Assignee: Richwood Industries, Huntington, WV (US)

(*) Notice: Subject to any disclaimer, the term of this patent is extended or adjusted under 35 U.S.C. 154(b) by 340 days.

(21) Appl. No.: 12/785,401

(22) Filed: May 21, 2010

(65) Prior Publication Data

US 2010/0294623 A1 Nov. 25, 2010

Related U.S. Application Data

(60) Provisional application No. 61/180,783, filed on May 22, 2009.

(51) Int. Cl.
*B65G 45/00* (2006.01)
*B65G 45/12* (2006.01)

(52) U.S. Cl.
USPC .......................................... 198/497; 198/499

(58) Field of Classification Search
None
See application file for complete search history.

(56) References Cited

U.S. PATENT DOCUMENTS

| 4,202,437 | A | 5/1980 | Gordon |
|---|---|---|---|
| 4,249,650 | A | 2/1981 | Stahura |
| 4,328,888 | A | 5/1982 | Luke |
| 4,402,394 | A | 9/1983 | Stoll |
| 4,658,949 | A | 4/1987 | Reicks |
| 4,696,388 | A | 9/1987 | Stoll |
| 4,825,997 | A | 5/1989 | Bowman et al. |
| 4,917,231 | A | 4/1990 | Swinderman |
| 4,953,689 | A | 9/1990 | Peterson et al. |
| 4,969,553 | A | 11/1990 | Stoll |
| 5,109,976 | A | 5/1992 | Mohri et al. |
| 5,310,042 | A | 5/1994 | Veenhof |
| 5,339,947 | A | 8/1994 | Campanile |
| 5,413,208 | A | 5/1995 | Veenhof |
| 5,628,392 | A * | 5/1997 | Stoll et al. ............ 198/497 |
| 5,647,476 | A | 7/1997 | Veenhof |
| 5,797,477 | A * | 8/1998 | Veenhof ............. 198/499 |
| 5,975,281 | A | 11/1999 | Yoshizako et al. |
| 6,056,111 | A | 5/2000 | Stoll et al. |
| 6,082,524 | A | 7/2000 | Brink |
| 6,296,105 | B1 | 10/2001 | Carnes |
| 6,315,105 | B1 | 11/2001 | Gibbs et al. |
| 6,321,901 | B1 | 11/2001 | Strebel et al. |
| 6,349,816 | B1 | 2/2002 | Tenzer et al. |
| 6,374,991 | B1 | 4/2002 | Swinderman |

(Continued)

FOREIGN PATENT DOCUMENTS

GB 1454763 9/1973

*Primary Examiner* — Kavel Singh
(74) *Attorney, Agent, or Firm* — Robert R. Waters; Brian W. Foxworthy; J. Michael Wells

(57) ABSTRACT

A reversible belt scraper blade provides two opposed scraping surfaces on an integrally constructed body. Each scraping surface has an elastomeric wear region transitioning to an elastomeric central region. Two integral frame members are integrally joined into the central region. Each integral frame member runs the length of the belt scraper blade and is at least partially exposed at their ends. End mounts attach to the exposed integral frame members and the reversible belt scraper blade is reversible about the end mounts. The wear regions may have sub-regions of different hardness to provide good scraping qualities combined with improved structural rigidity. The central region may also have sub-regions of different hardness to improve structural rigidity.

15 Claims, 9 Drawing Sheets

(56) References Cited

U.S. PATENT DOCUMENTS

| | | |
|---|---|---|
| 6,401,911 B1 | 6/2002 | Swinderman |
| 6,439,373 B1 | 8/2002 | Swinderman |
| 6,575,292 B2 | 6/2003 | Swinderman |
| 6,581,754 B2 | 6/2003 | Law |
| 6,619,469 B2 | 9/2003 | Malmberg |
| 6,695,123 B2 | 2/2004 | Stoll |
| 6,991,088 B1 | 1/2006 | Smith et al. |
| 7,004,304 B1 | 2/2006 | Smith et al. |
| 7,007,794 B2 * | 3/2006 | Waters et al. ............ 198/497 |
| 7,051,862 B1 | 5/2006 | Smith et al. |
| D524,009 S | 6/2006 | Smith et al. |
| 7,216,756 B2 | 5/2007 | Swinderman |
| 7,308,980 B2 | 12/2007 | Peterson et al. |
| 7,367,443 B2 | 5/2008 | Swinderman |
| 7,370,750 B2 | 5/2008 | Swinderman |
| 7,383,940 B1 | 6/2008 | Stumpf, Jr. et al. |
| 7,424,945 B2 | 9/2008 | Swinderman |
| 7,461,736 B2 | 12/2008 | Waters et al. |
| 2008/0179168 A1 | 7/2008 | Swinderman |

* cited by examiner

US 8,556,064 B2

DOUBLE EDGED BELT SCRAPER BLADE

CROSS REFERENCE TO RELATED APPLICATIONS

This application claims priority from U.S. Provisional Application 61/180,783, filed on May 22, 2009, and the teachings in the specification and accompanying submissions for U.S. Provisional Application 61/180,783, are incorporated herein by reference.

FIELD OF THE INVENTION

This invention relates generally to a belt scraper blade for a moving conveyor, more specifically this invention relates to a double edged belt scraper blade for endless conveyor belts carrying mining materials or earth, or other such materials. Belt scrapers are used in these applications to remove material adhering to the belt on the return run of the belt after the belt has dumped the bulk of material that it is carrying.

BACKGROUND OF THE INVENTION

Modern mining techniques make extensive use of endless belts to carry mined material from one location to another. For example, continuous belts may be used to carry mined material out of a mine and deposit it external to the mine. Endless belts may also be employed for carrying materials between processes. These belts can be extremely long and can move the material at high linear speeds. At the end of the belt, or rather where the belt begins its return journey, the belt passes around a wheel or pulley and begins the return journey. At that location, the materials on the belt are deposited. However, it is common for some residual material to adhere to the belt.

To reduce dust problems, particularly in coal mining, the load on the belt is sprayed with water. While this suppresses the dust, it increases the amount of material that adheres to the belt when the load is clumped. This material can transfer to pulleys, rollers, idlers, and bearings and build up. This build up of material causes excessive wear at a minimum and can cause seizing in bearings and may lead to fires, a catastrophic result. Belt scrapers are employed to remove this material from the belts to prevent the transfer to other elements of the conveying system, thereby preventing damage to those elements.

Scrapers are positioned to contact the belt on the terminating wheel or on the return run of the belt to remove this residual material. The dynamic nature of the environment and the abrasive nature of the materials being carried by the endless belt require belt scrapers that are durable and that can be maintained in contact with the belt with consistent pressure. The belt scrapers are expendable elements of the system and any economy that can be achieved with the belt scrapers is an improvement in the economic efficiency of the system. It is therefore highly desirable to have belt scrapers that are durable, that can be used over an extended period of time, and that can be economically manufactured.

RELEVANT ART

U.S. Pat. No. 5,628,392 by Stoll et al. claims a reversible belt scraper blade for cleaning high speed conveyor belts. A reversible belt scraper is provided with opposite belt scraping surfaces and is adapted to be reversed by inverting. The belt scraper is formed with a pair of metal side frames, and a transversely elongated body is formed as a block of rubber defining the belt scraping surfaces on opposite sides. A pair of fiberboard backing plates is positioned to support the rubber block against forces tending to bend or deflect the rubber. The fiberboard backing plates wear at a rate faster than the wear rate of the rubber block and assure full contact between the belt and the rubber scraping body. In a further embodiment, ceramic bricks are embedded within the rubber block with wear surfaces at the rubber scraping surface. The rubber, brick, and hacking plates are formed in modular segments which are stacked end-to-end between the frames and retained by metal slugs which extend through the segments.

Referring to FIG. 1, a prior art reversible belt scraper blade 10 may be seen. The prior art reversible belt scraper blade 10 of FIG. 1 comprises a rubber body or block 12 with two face surfaces 14, two phenolic resin impregnated fiber backing plates 16, two transversely extending steel side frames 18, two support ends 20, and several steel rectangular segments or slugs 24. The face surfaces 14 of rubber body or block 12 provide a cleaning region where belt scraper 10 contacts the belt and removes material from the belt, while phenolic resin impregnated fiber backing plates 16 provide strength and rigidity to rubber body or block 12 near the belt. Phenolic resin impregnated fiber backing plates 16 provide strength to rubber body or block 12 to maintain contact with the belt without risking damage to the belt which may result if metal reinforcements are used and come into contact with the belt. Although phenolic resin impregnated fiber backing plates 16 may be integrally molded onto rubber body or block 12, transversely extending steel side frames 18 along with support ends 20 provide a framework to keep phenolic resin impregnated fiber backing plates 16 in contact with rubber body or block 12 while reversible scraping blade 10 is in use in the high demand environment.

Transversely extending steel side frames 18 are joined with end flanges 22 of support ends 20. Support ends 20 have a cruciform cross section extending from reversible scraper blade 10 which is used to mount reversible scraper blade 10 in proximity to a belt. Several steel rectangular segments or slugs pass all the way through the body of reversible scraper blade 10 to pin transversely extending steel side frames 18 and phenolic resin impregnated fiber backing plates 16 to rubber body or block 12. Phenolic resin impregnated fiber backing plates 16 may have slots cut in them to accommodate steel rectangular segments or slugs 24, while rubber body or block 12 may simply have the steel rectangular segments or slugs punched through them. Transversely extending steel side frames 18, support ends 20, and steel rectangular segments or slugs 24 provide a framework to hold phenolic resin impregnated fiber backing plates 16 to rubber body or block 12 and gives reversible scraping blade 10 sufficient rigidity to maintain contact with a belt.

FIG. 2 is an end view of reversible scraping blade 10. In FIG. 2, an embodiment is shown where face surfaces 14 are extended somewhat beyond phenolic resin impregnated fiber backing plates 16. This is an initial state of reversible scraping blade 10, and as reversible scraping blade 10 is used, face surfaces 14 will wear down to approximately flush with phenolic resin impregnated fiber backing plates 16 and both face surfaces 14 and phenolic resin impregnated fiber backing plates 16 will wear together.

FIG. 3 is a cross-sectional view of the prior art reversible belt scraping blade 10 of FIG. 1 as indicated by arrows 3 in FIG. 1. In FIG. 3, steel rectangular segments or slugs 24 can be seen passing through transversely extending steel side frames 18, phenolic resin impregnated fiber backing plates 16, and rubber body or block 12. Steel rectangular segments or slugs 24 supplement the rigidity of the framework provided by transversely extending steel side frames 18 and support ends 20.

Further information and discussion of prior art reversible belt scraping blade 10 can be found in U.S. Pat. No. 5,628,392 by Stoll et al. However, the terminology and numbering may be different than that used herein. While the prior art reversible belt scraping blade 10 of U.S. Pat. No. 5,628,392 has excellent wear and rigidity along with the economy provided by the reversible nature of reversible belt scraping blade 10, the manufacture of reversible belt scraping blade 10 is somewhat labor and process intensive and the composite nature of reversible belt scraping blade 10 can limit the forces that may be applied to reversible belt scraping blade 10.

U.S. Pat. No. 4,696,388 by Stoll is for a conveyor belt scraper blade with contoured surface comprising a conveyor belt scraper blade assembly having an elongate blade body made of a resilient material and having a longitudinally-extending belt scraping surface, a frame attached to the body which imparts a convex shape to the belt scraping surface, and a pair of brackets mounted on the ends of the body for attaching the blade assembly to supporting structure. In a preferred embodiment, the blade body includes a central longitudinal slit and the frame includes an insert having a double convex shape which is fitted within the slit. The frame further includes a pair of opposing side walls which are attached to the insert and include a plurality of inwardly-directed prongs which engage the blade body and hold the body in position relative to the insert.

U.S. Pat. No. 6,619,469 by Malmberg is for a scraper blade made of more than one material. The scraper blade has at one end a scraper tip and at the other end a mounting base. The scraper tip is outwardly tapered. The scraper blade has at least two layers of different materials. The layer of material which is facing forward, i.e. that first meets the surface to be scraped, and which is adapted to form the actual scraper tip is made of a material which is both softer and more abrasion resistant than said other layer.

U.S. Pat. No. 7,007,794 by Waters et al., is for a one-piece integral multi-durometer scraper blade for a conveyor belt cleaner. The scraper blade includes a body extending longitudinally between a first end and a second end and extending transversely between a base and a tip. The body includes a first body portion comprising a first elastomeric material having a first durometer of hardness, and a second body portion comprising a second elastomeric material having a second durometer of hardness. The body also includes a transition portion located between the first body portion and the second body portion.

U.S. Pat. No. 7,461,736 by Waters et al, is a method patent generally claiming the methods of producing the apparatus claimed in U.S. Pat. No. 7,007,794. The methods claimed in U.S. Pat. No. 7,461,736 are directed to producing belt scraper blades that have various arrangements of materials of different durometers molded into a single unitary blade.

U.S. Pat. No. 4,202,437 by Gordon is for a scraper assembly for a conveyor belt. A conveyor belt scraper assembly having a scraper core attached to a shaft which holds the scraper core in adjustable spatial relationship with the conveyor belt, the scraper core having slide-in mounting channels which hold resilient scraper blades in contact with the conveyor belt to remove foreign matter therefrom and to allow expeditious replacement of worn-out blades, the scraper core also being rotationally and linearly adjustable to permit compensation for a substantial range of wear on the blade edge surface.

SUMMARY OF THE INVENTION

It is highly desirable to have a belt scraper blade that combines many features. It is desirable that a belt scraper blade be economical by providing multiple cleaning edges or surfaces allowing the belt scraper blade to be used multiple times. It is desirable that the cleaning edge or surface in contact with the belt be easily changed. It is desirable that the cleaning surfaces of the belt scraper blade be abrasion resistant. It is desirable that the belt scraper blade provide low risk of damage to the conveyor belt while minimizing the deformation and deterioration of the effectiveness of the cleaning surface. It is desirable that the overall structure of the belt scraper blade be sufficiently rigid to maintain contact with the belt. It is desirable that the belt scraper blade be easily produced. It is desirable that the easily produced belt scraper blade be of integral construction to enhance durability. The embodiments of the reversible belt scraper blade of the current invention meet these needs.

At least one embodiment of the double edged belt scraper blade has a body with two opposing contact surfaces having two wear regions extending from the contact surfaces to a central region. The central region of the body partially encases two integral frame members which run from end to end to the body. End mounts attach to the integral frame members at each end of the body.

BRIEF DESCRIPTIONS OF THE DRAWINGS

DETAILED DESCRIPTION OF EMBODIMENTS

Figure 1:
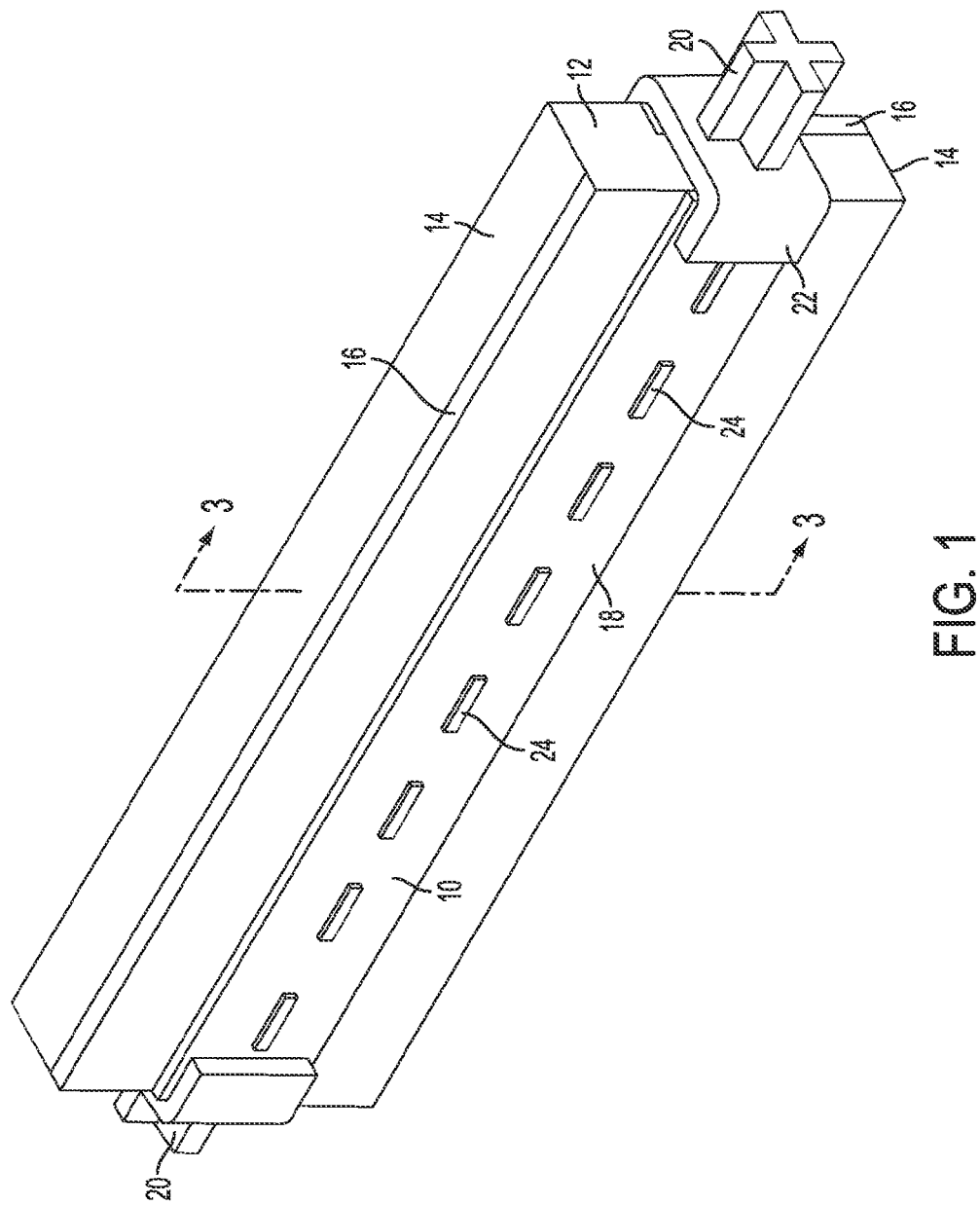
FIG. 1 is a perspective view of a prior art reversible belt scraper blade.
Figure 2:
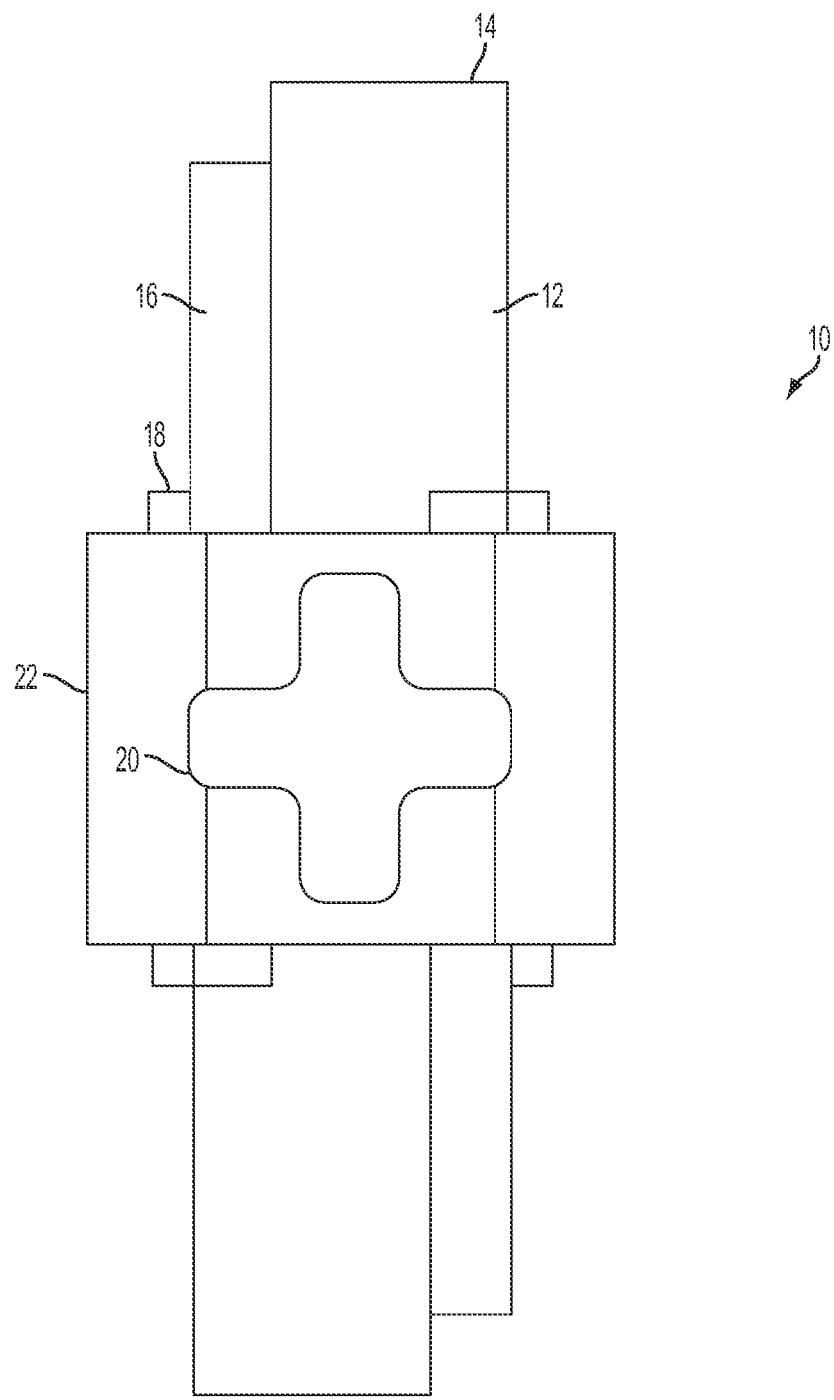
FIG. 2 is an end view of a prior art reversible belt scraper blade.
Figure 3:
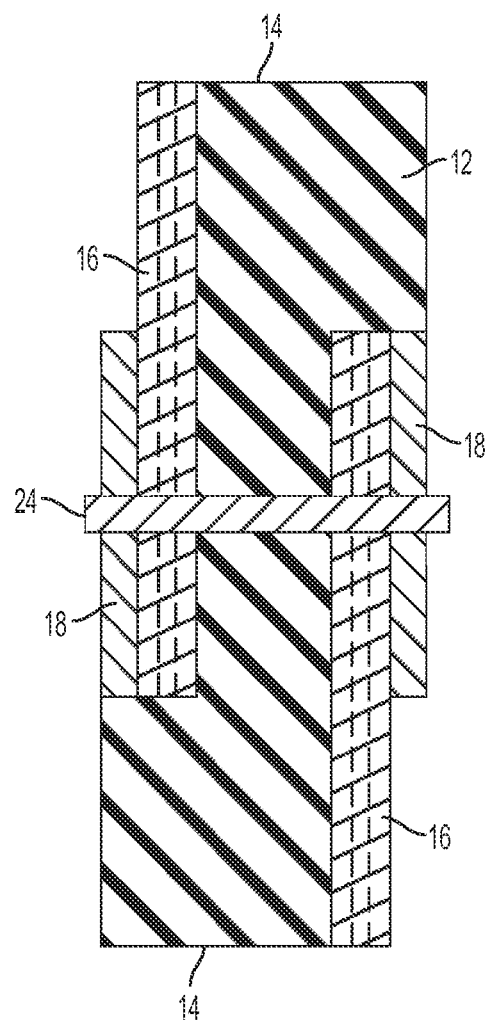
FIG. 3 is a sectional view through a prior art reversible belt scraper blade of FIG. 1 taken along line 3-3 of FIG. 1.
Figure 4:
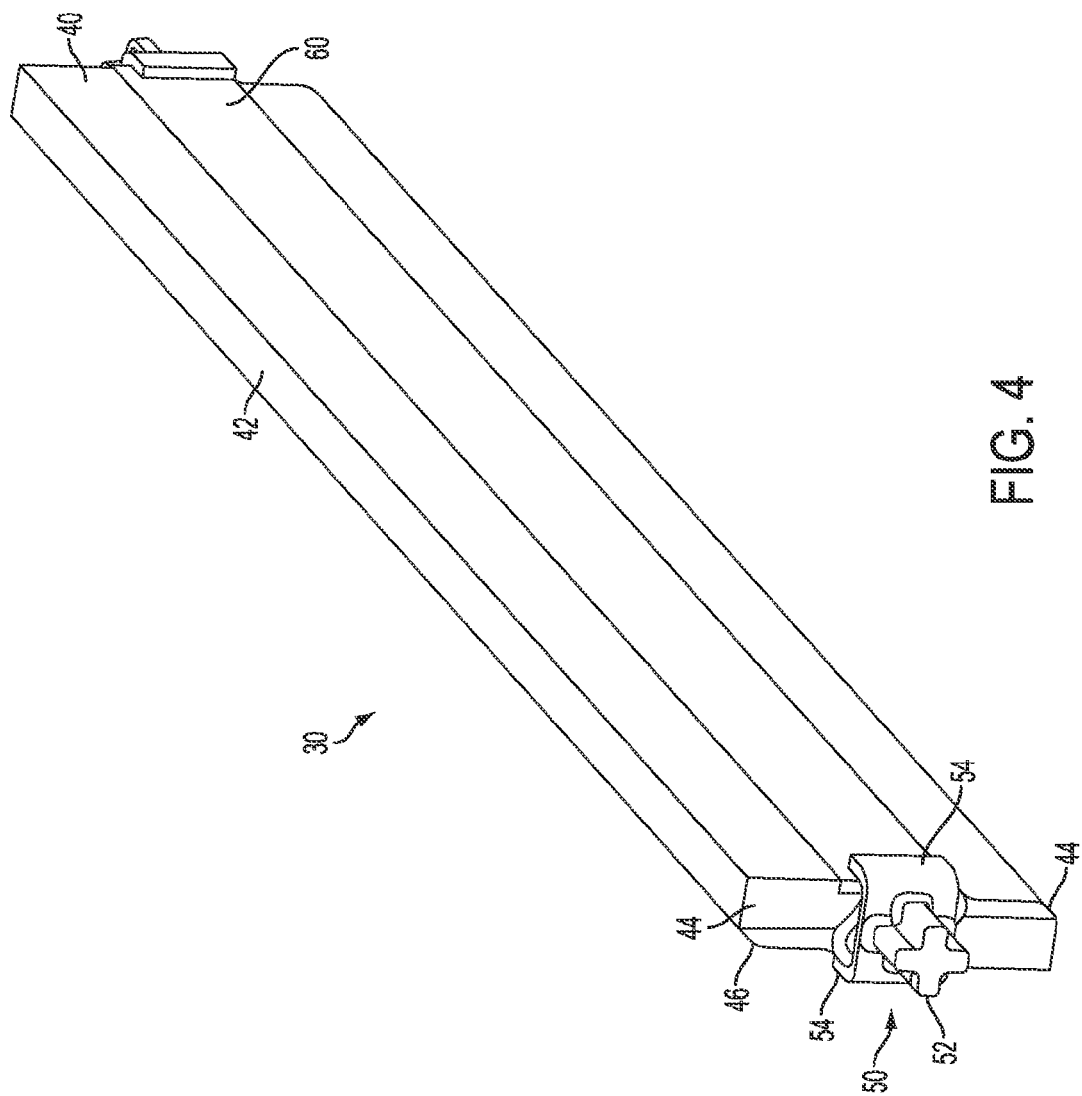
FIG. 4 is a perspective view of an embodiment of the reversible belt scraper blade.

Referring now to FIG. 4, an embodiment of the reversible belt scraper blade 30 of the present invention is shown. Reversible belt scraper blade 30 is generally made of a body 40, end mounts 50, and integral frame members 60. End mounts 50 and integral frame members 60 provide structure and a mounting framework to mount reversible belt scraper blade 30, while contact surfaces 42 on body 40 actually contact the belt and scrape material from the belt. Body 40 may be made of one or more materials such as rubber, urethane, or other elastomer, and when body 40 is made of more than one elastomer, they may have different durometer values or hardness. Body 40 is integrally formed around integral frame members 60 with at least a portion of integral frame members 60 exposed at the surface, which provides a structure to which end mounts 50 attach.

Figure 5:
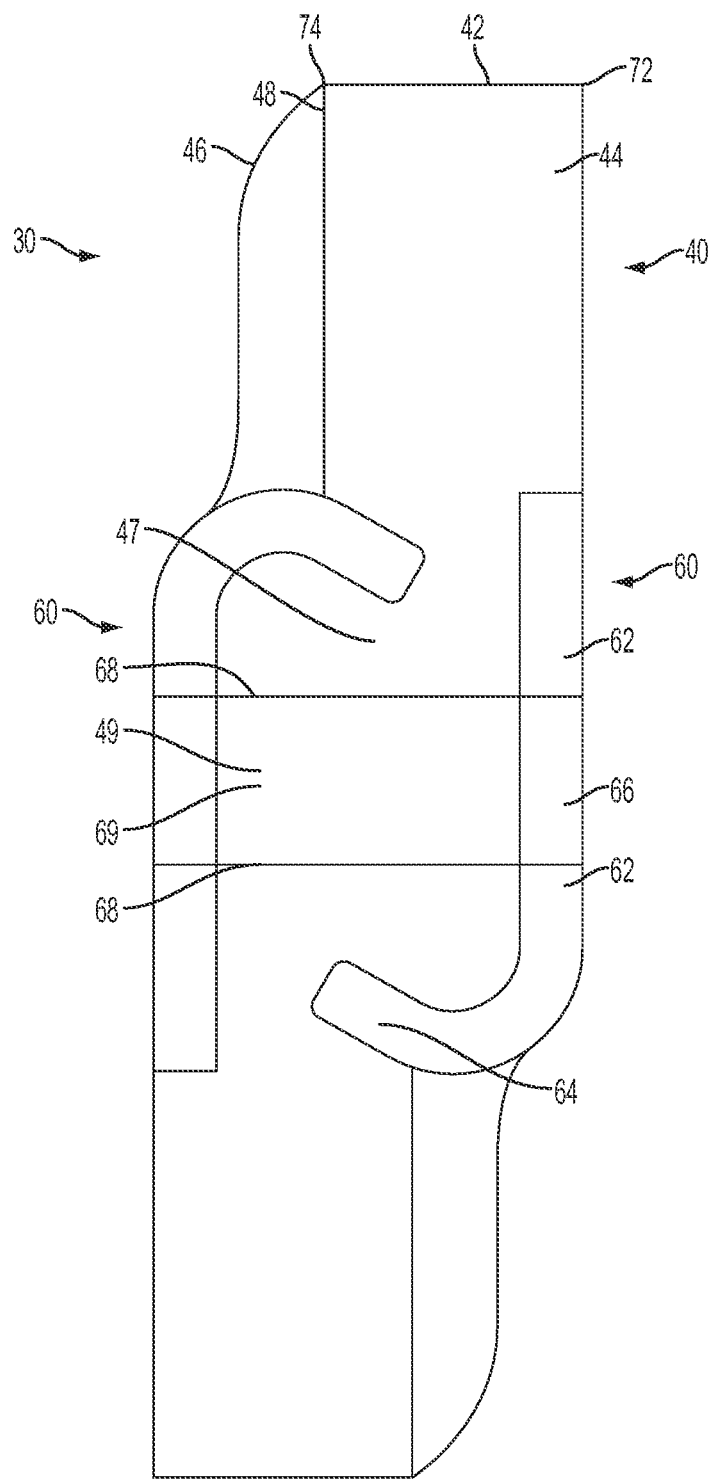
FIG. 5 is an end view of an embodiment of the reversible belt scraper blade without end mounts.

Referring now to FIG. 5, FIG. 5 is an end view of reversible belt scraper blade 30 without end mounts 50. It can be seen in FIG. 5 that while body 40 extends continuously from contact surface 42 at one scraping surface to another contact surface 42 at a second scraping surface, body 40 also has regions subdividing it. Referring now to only the top portion of body 40 in FIG. 5, it can be seen that a large, substantially rectangular region defines most of the top portion of body 40 and this large, substantially rectangular region 44 is topped by contact surface 42. Contact surface 42 has a leading edge 72 and a trailing edge 74. To one side of large, substantially rectangular region 44 is a thinner contoured second region 46. Together, first region 44 and second region 46 combine to form a wear region that will wear and be consumed as contact surface 42 scrapes on a belt to remove material. In the embodiment shown in FIG. 5, as belt scraper 30 wears, trailing edge 74 will move back to second region 46.

Large, substantially rectangular first region 44 and thinner contoured second region 46 may be made of materials having different durometer readings. In embodiments made of more than one elastomer, knit line 48 in FIG. 5 demarcates the differences in material of first region 44 and second region 46. In most such embodiments of reversible belt scraper blade 30, first region 44 will have a lower durometer reading and therefore be softer while second region 46 will have a higher durometer reading and therefore be harder, or stiffer. This configuration provides a large but soft contact surface 42 predominantly of region 44 which can remove material from a belt while remaining more abrasion resistant than second region 46. Second region 46, with its harder durometer reading, provides stiffness and structural support to first region 44 so that first region 44 can withstand greater contact pressures against the belt without excessive deformation away from the belt. Although knit line 48 is shown as a distinct line, it may, in many embodiments, actually represent a transition zone from a first durometer reading region to a second durometer reading region. Second region 46, with its higher durometer reading, provides structural stiffness and support to first region 44 without the need for an additional metal stiffener or similar item to provide strength near to the belt. The direction of movement of the belt will usually be from the free corner of contact surface 42, leading edge 72, toward the corner of contact surface 42, trailing edge 74, supported by second region 46. The wearing of second region 46 is designed to keep pace with the wearing of first region 44.

Referring still to FIG. 5, the ends of integral frame members 60 can be seen. Integral frame members 60 run from end to end of reversible belt scraper blade 30, as may be seen in FIG. 4, and integral frame members 60 are comprised of two legs, a surface leg 62 and a transverse leg 64. Surface leg 62 forms part of the surface of reversible belt scraper blade 30 and provides strength to belt scraper blade 30 in the direction normal to edge surfaces 42. Transverse legs 64 of integral frame members 60 extend into the interior of body 40 and provide strength to the reversible belt scraper blade 30 in the direction parallel to contact surfaces 42, or in the direction of travel of the belt. Transverse leg 64 of integral frame member 60 also provides an anchoring contour for integral frame members 60 to thoroughly join or integrate with body 40 of reversible belt scraper blade 30.

Body 40 has a central region 47 which is located between integral frame members 60. In some embodiments of reversible belt scraper blade 30, central region 47 may have the same durometer material as first rectangular region 44. Other embodiments of reversible belt scraper blade 30 may have additional elements in central region 47. Referring to the embodiment shown in FIG. 5, lines 68, while representing the edges of the surface feature notch 49, also indicate the boundary of an additional structural feature, web region 69. Web region 69 spans the space between integral frame members 60 providing additional structural strength to that provided by integral frame members 60 by approximating the structure of an I-beam. In particular, web region 69 provides additional strength in the direction perpendicular to the belt width dimension of reversible belt scraper blade 30.

Figure 7:
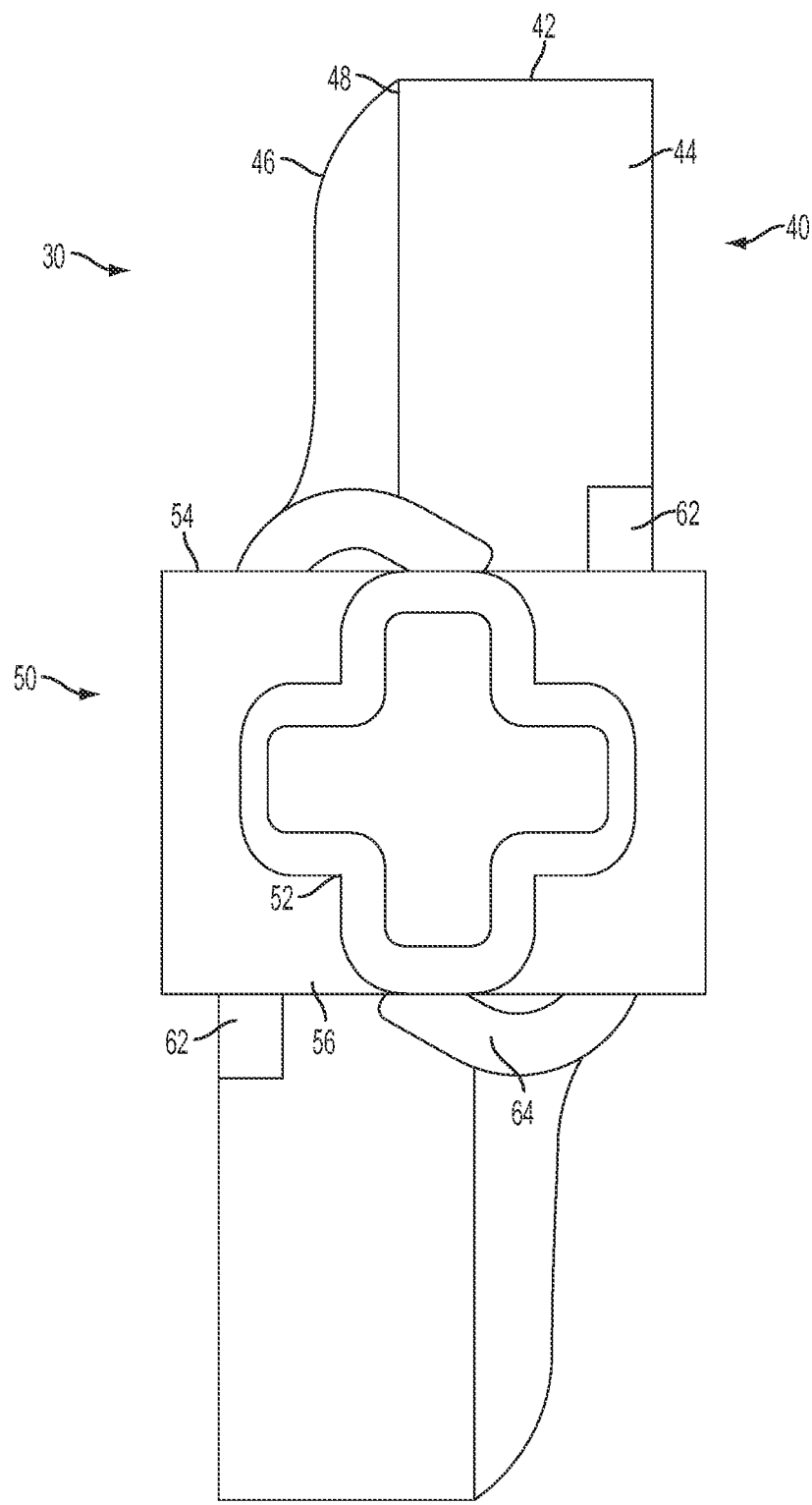
FIG. 7 is an end view of an embodiment of the reversible belt scraper blade with end mounts.
Figure 8:
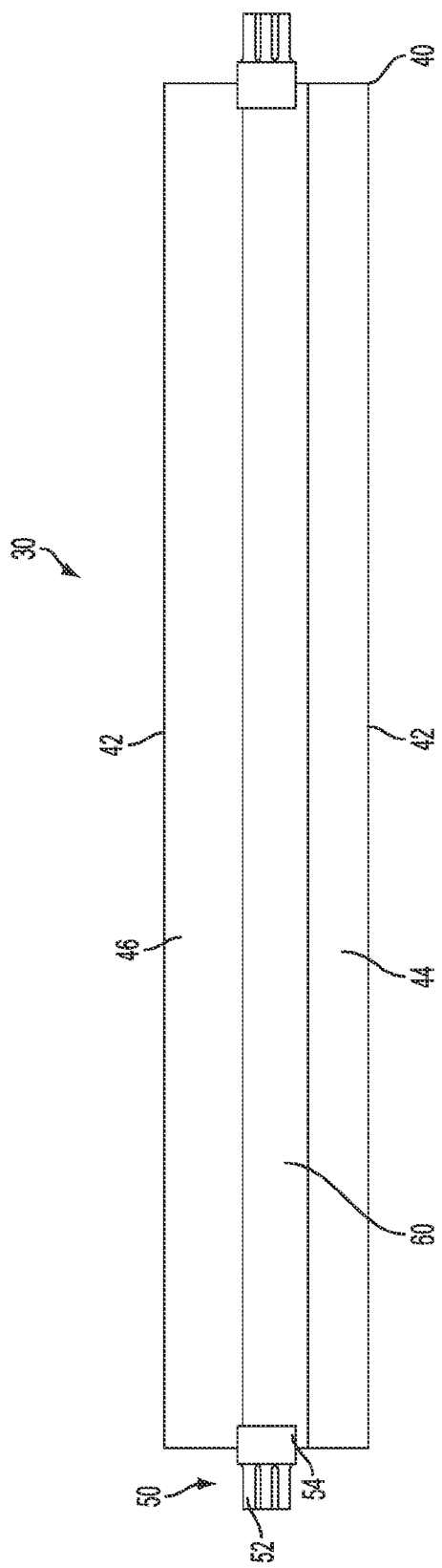
FIG. 8 is a side view of an embodiment of the reversible belt scraper blade with end mounts.

In use, reversible belt scraper blade 30 is mounted by end mounts 50, see FIGS. 4, 7, and 8, and held in contact with a belt passing at relatively high rate to scrape residual material from the belt. Surface legs 62 of integral frame members 60 provide structural rigidity to maintain reversible belt scraper blade 30 in contact with the belt along the width of the belt. Transverse legs 64 of integral frame members 60 provide structural rigidity in the direction of travel of the belt. However, being mounted by its ends, reversible belt scraper blade 30 may experience forces at considerable distance from any point where it is supported. For example the middle of reversible belt scraper blade 30, concurring essentially with the middle of the belt, may be a considerable distance from end mounts 50 where reversible belt scraper blade 30 is mounted and supported. Additionally, if reversible belt scraper blade 30 is used on the bottom side of a belt which is carrying a load, as opposed to being used on the load carrying surface on the return run, the load is likely to be heaviest in the middle of the belt and therefore the forces the greatest at the middle. Since the belt is traveling and not static, this results in substantial transverse loads on reversible belt scraper blade 30. Web region 69 provides additional structural rigidity to reversible belt scraper blade 30, particularly in the direction parallel to belt travel and transverse to belt width.

In some embodiments of reversible belt scraper blade 30 having web region 69, web region 69 may be made of an elastomer of higher durometer than is present in the rest of central region 47. The higher durometer elastomer has greater stiffness and therefore better provides strength. Although lines 68 in FIG. 5 indicate a web region 69 with clearly defined boundaries and discontinuous transition from one durometer to another, web region 69 may vary in shape along the belt width dimension of reversible belt scraper blade 30 and the durometer for web region 69, and the durometer for the rest of central region 47 may have a gradual change from one to the other through a transition zone. The shape of web region 69 and the transition from one durometer to another will be determined by the particular application in which a given embodiment of reversible belt scraper blade 30 is to be used and the manner in which it is produced.

In some embodiments of belt scraper 30 having web region 69, web region 69 may be made of an additional prefabricated insert such as integral frame members 60. In these embodiments, web region 69 will have more clearly defined boundaries within central region 47. In some embodiments of reversible belt scraper blade 30, a prefabricated web region 69 may be attached to integral frame members 60. This attachment may occur in any applicable manner such as welding, riveting, adhesive bonding, etc.

If the particular use for a given embodiment of reversible belt scraper blade 30 requires it, web region 69 may have a shape that varies along the belt width dimension of reversible belt scraper blade 30. For example, web region 69 may be largest at the middle of reversible belt scraper blade 30 to provide greatest rigidity at a point furthest from support for reversible belt scraper blade 30. This may be accomplished in embodiments of reversible belt scraper blade 30 having a higher durometer web region 69 or a prefabricated web region 69.

Figure 6:
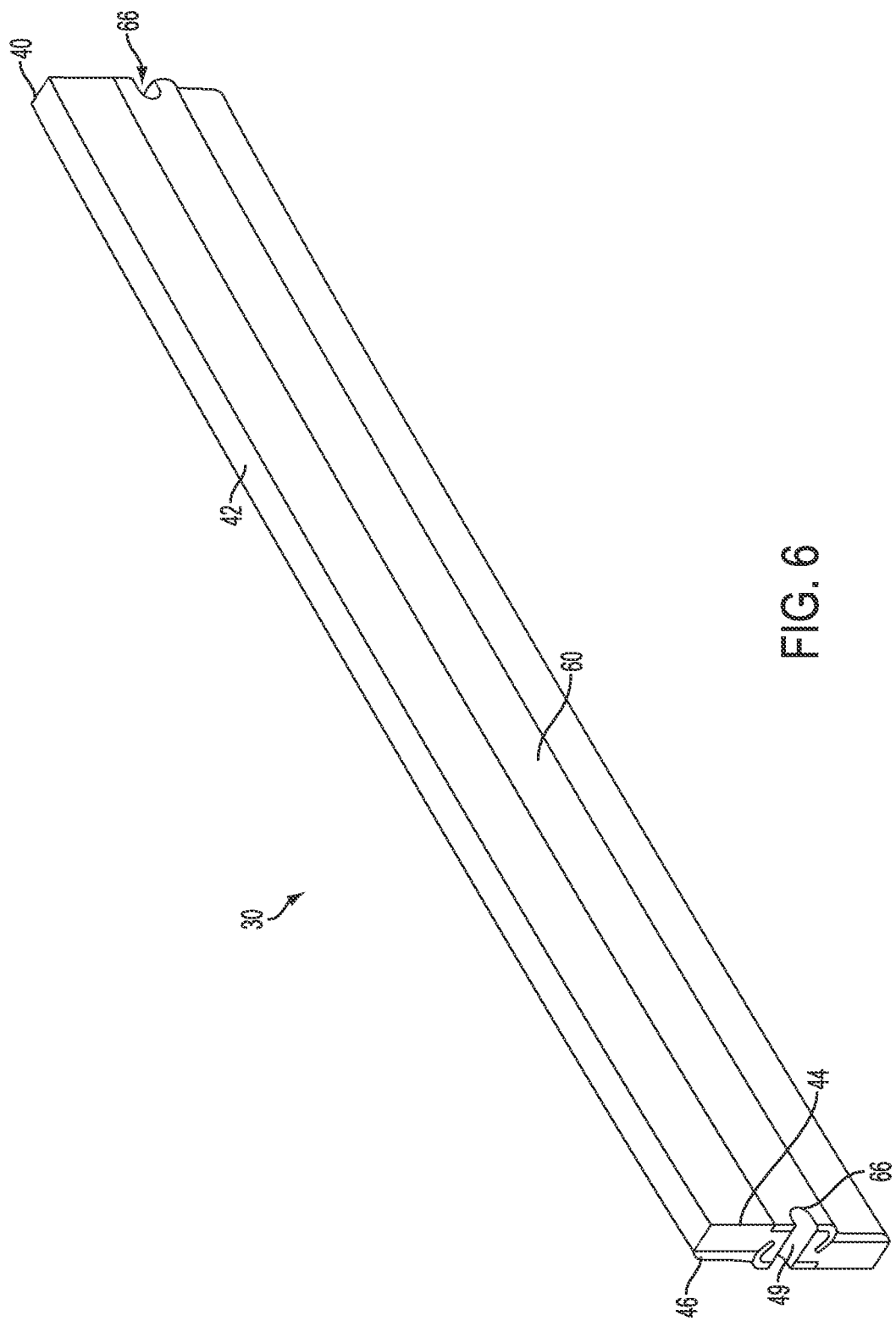
FIG. 6 is a perspective view of an embodiment of the reversible belt scraper blade without end mounts.

FIG. 6 is a perspective view of reversible belt scraper blade 30 without end mounts 50. In FIG. 6, notches 66 are more visible in integral frame members 60. Notches 66 in integral frame members 60 are alignment features for placing integral frame members 60 in the mold for producing the body of reversible belt scraper blade 30 and are also location features for the assembly of end mounts 50 onto the rest of reversible belt scraper blade 30. Notches 49 in the ends of body 40 are a function of the manufacture of reversible belt scraper blade 30 and not inherently necessary for the function of reversible belt scraper blade 30. Although notches 66 in integral frame members 60 are useful to the production of reversible belt scraper blade 30, they should not be regarded as a required feature of embodiments of the present invention and other methods could be used to facilitate the molding and assembly of reversible belt scraper blade 30.

FIG. 7 is an end view of reversible belt scraper blade 30 with end mounts 50. End mounts 50 may also be seen in FIG. 4. Prominent features of end mounts 50 are cruciform stud 52 and flanges 54. Flanges 54 of end mounts 50 are welded to integral frame members 60 to complete the assembly of reversible belt scraping blade 30. Cruciform studs 52 of end mounts 50 provide a positive mount for reversible belt scraper blade 30. Cruciform studs 52 provide a quick and easy orientation of reversible belt scraping blade 30 so that reversible belt scraping blade 30 is positively located in its holder. Reversible belt scraping blade 30 may be reoriented by 180 degrees by rotating reversible belt scraper blade 30 about the axis represented by cruciform studs 52 to present a new contact surface 42 to the belt. This is a much less cumbersome process than flipping the reversible belt scraping blade 30 about its long dimension.

FIG. 8 is a side view of an embodiment of the reversible belt scraping blade 30 with end mounts 50 in place. End mounts 50 attach to integral frame members 60 at least at flange 54. Cruciform mounting studs 52 provide means for mounting reversible belt scraping blade 30 in position to contact a conveyor belt. Contoured second region 46 is visible at the top of FIG. 8, while rectangular first region 44 is visible at the bottom of FIG. 8.

Figure 9:
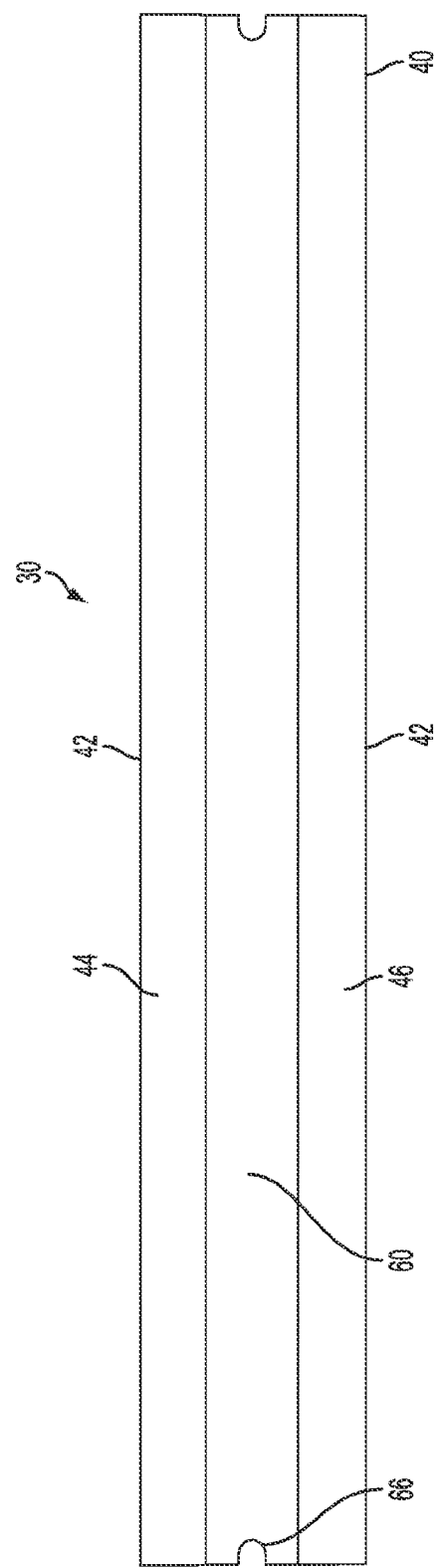
FIG. 9 is a side view of an embodiment of the reversible belt scraper blade without end mounts.

FIG. 9 is a side view of an embodiment of the reversible belt scraper blade 30 without end mounts 50. Notches 66 in integral frame members 60 are visible at each end of reversible belt scraping blade 30. Rectangular first region 44 is visible at the top of FIG. 9, while contoured second region 46 is visible at the bottom of FIG. 9.

While specific embodiments of reversible belt scraping blade 30 have been discussed, these embodiments should not be taken as exhaustive of possible embodiments which would still be within the scopes and claims of this invention. For example, while integral frame members 60 in the embodiments discussed have an overall "J" shaped cross section, integral frame members 60 could take many forms. Likewise, end mounts 50 are shown with a specific configuration, but would not necessarily have to have a cruciform stud in every case. For example, a square stud, or even a flat elongated stud, may suffice depending on the holder. In some embodiments, end mounts 50 may consist only of flanges 54 wrapped around integral frame members 60 with no protruding studs at all. Similarly, the specific configuration of first durometer region 44 running the width of reversible belt scraping blade 30 may comprise more or less of the bulk of body 40, and second durometer region 46 may also comprise more or less of body 40. Factors which may influence the ratio of these areas are the relative costs of materials and the specific applications in which the reversible belt scraping blade 30 is to be used. The abstract is intended only as a brief overview of the specification and is not intended to define the invention claimed. The drawings are not exhaustive depictions of the numerous embodiments encompassed by the present invention.

We claim:

1. A reversible double edged belt scraper blade for a conveyor belt comprising;
an elastomeric body comprising;
a first contact surface having a leading edge and a trailing edge,
a first wear region extending from said first contact surface,
a second contact surface having a leading edge and a trailing edge,
a second wear region extending from said second contact surface, and,
a central region joining said first wear region and said second wear region generally in opposition to each other and resulting in said elastomeric body having said first contact surface, said second contact surface, a first side, a second side, and two ends;
a first integral frame member integrally molded into said first side of said elastomeric body at said central region, said first integral frame member extending the length of said elastomeric body from end to end;
a second integral frame member integrally molded into said second side of said elastomeric body at said central region, said first integral frame member extending the length of said elastomeric body from end to end, and;
a mount at each end of said elastomeric body, each said mount being attached to said first integral frame member and said second integral frame member.

2. The belt scraper blade of claim 1, wherein;
each said wear region is comprised of at least two sub-regions, each said sub-region being comprised of an elastomer of different hardness.

3. The belt scraper blade of claim 2, wherein;
each said wear region is comprised of a scraping region and a structural region, said scraping region being of a softer elastomer than said structural region;
said scraping region extending from said leading edge of said contact surface toward said trailing edge and toward said central region, said scraping region being at least the majority of said wear region;
said structural region extending from said trailing edge of said contact surface toward said leading edge and toward said central region.

4. The belt scraper blade of claim 2, further comprising;
transition zones to transition between regions comprised of elastomers of different hardness.

5. The belt scraper blade of claim 1, wherein;
each said integral frame member is comprised of a surface leg and a transverse leg,
said surface leg of each said integral frame member being at the surface of the respective side of said elastomeric body,
said transverse leg of each said integral frame member being at an angle with said surface leg and extending into the interior of said elastomeric body,
said surface leg and said transverse leg extending the length of said integral frame members.

6. The belt scraper blade of claim 5, wherein;
each said integral frame member has an assembly notch at each end of said surface leg.

7. The belt scraper blade of claim 1, wherein;
each said mount comprises a cruciform stud extending outwardly from the end of said elastomeric body.

8. The belt scraper blade of claim 1, further comprising;
a web region within said central region, said web region extending from said first integral frame member to said second integral frame member and being generally centered in said central region, said web region being comprised of a harder elastomer than the rest of said central region.

9. The belt scraper blade of claim 1, wherein;
said leading edge of said first contact surface is at said first side of said elastomeric body and said leading edge of said second contact surface is at said second side of said elastomeric body.

10. A reversible double edged belt scraper blade for a conveyor belt comprising;
an elastomeric body comprising
a first contact surface having a leading edge and a trailing edge,
a first wear region extending from said first contact surface,
a second contact surface having a leading edge and a trailing edge,
a second wear region extending from said second contact surface, and,
a central region joining said first wear region and said second wear region generally in opposition to each other and resulting in said elastomeric body having said first contact surface, said second contact surface, a first side, a second side, and two ends, and;
a mount at each end of said elastomeric body, wherein;
each said wear region is comprised of a scraping region and a structural region, said scraping region being of a softer elastomer than said structural region;
said scraping region extending from said leading edge of said contact surface toward said trailing edge and toward said central region, said scraping region being at least the majority of said wear region;
said structural region extending from said trailing edge of said contact surface toward said leading edge and toward said central region.

11. The belt scraper blade of claim 10, further comprising;
a first integral frame member integrally joined into said first side of said elastomeric body at said central region, said first integral frame member extending the length of said elastomeric body from end to end;
a second integral frame member integrally joined into said second side of said elastomeric body at said central region, said first integral frame member extending the length of said elastomeric body from end to end, wherein;
said mount at each end of said elastomeric body is attached to said first integral frame member and said second integral frame member.

12. The belt scraper blade of claim 11, wherein;
each said integral frame member is comprised of a surface leg and a transverse leg,
said surface leg of each said integral frame member being at the surface of the respective side of said elastomeric body,
said transverse leg of each said integral frame member being at an angle with said surface leg and extending into the interior of said elastomeric body,
said surface leg and said transverse leg extending the length of said integral frame members.

13. The belt scraper blade of claim 10, wherein;
each said mount comprises a cruciform stud extending outwardly from the end of said elastomeric body.

14. The belt scraper blade of claim 10, further comprising;
a web region within said central region, said web region extending from said first side to said second side and being generally centered in said central region, said web region being comprised of a harder elastomer than the rest of said central region.

15. A double edged belt scraper blade for a conveyor belt scraper comprising;
an elastomeric body having;
a first contact surface having a leading edge and a trailing edge,
a second contact surface having a leading edge and a trailing edge,
a first side extending from said leading edge of said first contact surface to said trailing edge of said second contact surface,
a second side extending from said leading edge of said second contact surface to said trailing edge of said first contact surface, said first contact surface and said second contact surface being generally opposite each other and said first side and said second side being generally opposite each other, and,
two ends at the contiguous edges of said first contact surface, said second contact surface, said first side, and said second side;
a first integral frame member extending the length of said elastomeric body from end to end and integrally molded into said first side of said elastomeric body, said first integral frame member being centrally located in said first side;
a second integral frame member extending the length of said elastomeric body from end to end and integrally molded into said second side of said elastomeric body, said second integral frame member being centrally located in said second side, said first and second integral frame members generally defining/enclosing a central region in said elastomeric body;
a first wear region in said elastomeric body extending from said first contact surface to said central region;
a second wear region in said elastomeric body extending from said second contact surface to said central region, and;
a mount at each end of said elastomeric body, each said mount attached to said first and second integral frame members;
the double edged belt scraper blade being reversible about said mounts.

* * * * *